US007023543B2

(12) United States Patent
Cunningham

(10) Patent No.: US 7,023,543 B2
(45) Date of Patent: Apr. 4, 2006

(54) METHOD FOR CONTROLLING THE LUMINOUS FLUX SPECTRUM OF A LIGHTING FIXTURE

(76) Inventor: David W. Cunningham, 8442 Hollywood Blvd., Los Angeles, CA (US) 90069

( * ) Notice: Subject to any disclaimer, the term of this patent is extended or adjusted under 35 U.S.C. 154(b) by 0 days.

(21) Appl. No.: 10/211,769

(22) Filed: Aug. 1, 2002

(65) Prior Publication Data

US 2004/0021859 A1 Feb. 5, 2004

(51) Int. Cl.
*G01J 3/00* (2006.01)

(52) U.S. Cl. ........................ 356/300; 315/312; 362/227

(58) Field of Classification Search ................ 356/300; 362/227; 315/309, 312
See application file for complete search history.

(56) References Cited

U.S. PATENT DOCUMENTS 5,384,519 A 1/1995 Gotoh ........................ 315/324
6,051,935 A 4/2000 Bucks et al. ................ 315/224
6,142,629 A * 11/2000 Adel et al. .................. 351/206
6,411,046 B1 * 6/2002 Muthu ........................ 315/309
2002/0001080 A1 * 1/2002 Miller et al. ................ 356/326
2002/0047624 A1 4/2002 Stam et al. ................. 315/291
2002/0097000 A1 7/2002 Muthu et al. ............... 315/219
2002/0172039 A1 * 11/2002 Inditsky ...................... 362/231
2003/0107887 A1 * 6/2003 Eberl ......................... 362/227

FOREIGN PATENT DOCUMENTS

EP 1 152 642 A2 11/2001
WO WO 01/36864 A2 5/2001

* cited by examiner

*Primary Examiner*—Gregory J. Toatley, Jr.
*Assistant Examiner*—Kara Geisel
(74) *Attorney, Agent, or Firm*—Foley Hoag LLP

(57) ABSTRACT

A method is disclosed for controlling a lighting fixture of a kind having individually colored light sources, e.g., LEDs, that emit light having a distinct luminous flux spectrum that varies in its initial spectral composition, that varies with temperature, and that degrades over time. The method controls such fixture so that it projects light having a predetermined desired flux spectrum despite variations in initial spectral characteristics, despite variations in temperature, and despite flux degradations over time.

23 Claims, 9 Drawing Sheets

METHOD FOR CONTROLLING THE LUMINOUS FLUX SPECTRUM OF A LIGHTING FIXTURE

BACKGROUND OF THE INVENTION

This invention relates generally to lighting fixtures and, more particularly, to lighting fixtures configured to produce light having a selected color spectrum.

Lighting fixtures of this kind have been used for many years in theater, television, and architectural lighting applications. Typically, each fixture includes an incandescent lamp mounted adjacent to a concave reflector, which reflects light through a lens assembly to project a beam of light toward a theater stage or the like. A color filter can be mounted at the fixture's forward end, for transmitting only selected wavelengths of the light emitted by the lamp, while absorbing and/or reflecting other wavelengths. This provides the projected beam with a particular spectral composition.

The color filters used in these lighting fixtures typically have the form of glass or plastic films, e.g., of polyester or polycarbonate, carrying a dispersed chemical dye. The dyes transmit certain wavelengths of light, but absorb the other wavelengths. Several hundred different colors can be provided by such filters, and certain of these colors have been widely accepted as standard colors in the industry.

Although generally effective, such plastic color filters usually have limited lifetimes, caused principally by the need to dissipate large amounts of heat derived from the absorbed wavelengths. This has been a particular problem for filters transmitting blue and green wavelengths. Further, although the variety of colors that can be provided is large, these colors nevertheless are limited by the availability of commercial dyes and the compatibility of those dyes with the glass or plastic substrates. In addition, the very mechanism of absorbing non-selected wavelengths is inherently inefficient. Substantial energy is lost to heat.

In some lighting applications, gas discharge lamps have been substituted for the incandescent lamps, and dichroic filters have been substituted for the color filters. Such dichroic filters typically have the form of a glass substrate carrying a multi-layer dichroic coating, which reflects certain wavelengths and transmits the remaining wavelengths. These alternative lighting fixtures generally have improved efficiency, and their dichroic filters are not subject to fading or other degradation caused by overheating. However, the dichroic filters offer only limited control of color, and the fixtures cannot replicate many of the complex colors created by the absorptive filters that have been accepted as industry standards.

Recently, some lighting fixtures have substituted light-emitting diodes (LEDs) for incandescent lamps and gas-discharge lamps. Red-, green-, and blue-colored LEDs typically have been used, arranged in a suitable array. Some LED fixtures have further included amber-colored LEDs. By providing electrical power in selected amounts to these LEDs, typically using pulse-width modulated electrical current, light having a variety of colors can be projected. These fixtures eliminate the need for color filters, thereby improving on the efficiency of prior fixtures incorporating incandescent lamps or gas-discharge lamps.

One deficiency of LED lighting fixtures of this kind is that the flux magnitude and the peak flux wavelength can vary substantially from device to device and also can vary substantially with the junction temperature of each device, with LEDs of different colors exhibiting substantially different flux temperature coefficients. Moreover, the amount of flux produced by each device generally degrades over time, and that degradation occurs at different rates for different devices, depending on their temperatures over time and on their nominal color. All of these factors can lead to substantial variations in the color spectrum of the composite beam of light projected by such fixtures.

To date, LED lighting fixtures have not been configured to compensate for the identified variations in flux and spectral composition. Users of such fixtures have simply accepted the fact that the color spectra of the projected beams of light will have unknown initial composition, will change with temperature variations, and will change over time, as the LEDs degrade.

It should be apparent from the foregoing description that there is a need for an improved method for controlling a lighting fixture of a kind having individually colored light sources, e.g., LEDs, that emit light having a distinct luminous flux spectrum that varies in its initial spectral composition, that varies with temperature, and that degrades over time. In particular, there is a need for a means of controlling such fixture so that it projects light having a predetermined desired flux spectrum despite variations in initial spectral characteristics, despite variations in temperature, and despite degradation over time. The present invention satisfies these needs and provides further related advantages.

SUMMARY OF THE INVENTION

The present invention resides in an improved method for controlling a lighting fixture of a kind having individually colored light sources, e.g., LEDs, that emit light having a distinct luminous flux spectrum that varies in its initial spectral composition, that varies with temperature, and that degrades over time. The method controls the fixture so that it projects light having a predetermined desired flux spectrum despite variations in initial spectral characteristics, and/or despite variations in temperature, and/or despite flux degradations over time.

More particularly, in one aspect of the invention, the method controls the luminous flux spectrum of light produced by the lighting fixture despite each group emitting light having a distinct luminous flux spectrum subject to substantial initial variability. The method includes an initial step of calibrating each of the plurality of groups of light-emitting devices by measuring the spectral distribution of light emitted by the group in response to a predetermined electrical power input, and a further step of supplying a prescribed amount of electrical power to the light-emitting devices in each of the plurality of groups of devices, such that the groups of devices cooperate to emit light having a desired composite luminous flux spectrum.

In this aspect of the invention, the step of calibrating includes measuring the magnitude of flux emitted by each of the plurality of groups of light-emitting devices in response to a predetermined electrical power input. The peak wavelength and the spectral half-width of flux emitted by each of the plurality of groups of light-emitting devices also can be measured.

The method can be made to control the lighting fixture such that its emitted light has a composite luminous flux spectrum emulating the luminous flux spectrum of a known light source, with or without a filter. The step of supplying can include supplying an amount of electrical power to each of the light-emitting devices in each of the plurality of groups of devices, such that the plurality of groups of devices cooperate to emit light having a composite luminous flux spectrum that has a minimum normalized mean deviation across the visible spectrum relative to the luminous flux spectrum of a known light source to be emulated, with or without a color filter, or of a custom spectrum.

In a separate and independent aspect of the invention, the method controls the luminous flux spectrum of light produced by the lighting fixture despite each group emitting light having a distinct luminous flux spectrum that varies with temperature. The method includes an initial step of determining the temperatures of the light-emitting devices in each of the plurality of groups of devices, a further step of determining the spectral distribution of the flux emitted by each of the plurality of groups of light-emitting devices based on the temperature determinations, and a further step of supplying a prescribed amount of electrical power to the light-emitting devices in each of the plurality of groups of devices, such that the groups of devices cooperate to emit light having the desired composite luminous flux spectrum.

More particularly, each group of light-emitting devices can emit flux having a magnitude and, in some cases, a peak wavelength that vary with temperature. The step of determining the spectral distribution of the flux emitted by each of the plurality of groups of light-emitting devices can include considering measurements of the magnitude and, optionally, the peak wavelength of flux emitted by each of the plurality of groups of devices at a plurality of test temperatures.

The plurality of groups of light-emitting devices can be mounted on a heat sink, and the step of determining the temperature of each of the light-emitting devices can include measuring the temperature of the heat sink using a single temperature sensor, and calculating the temperature of each of the light-emitting devices based on the amount of electrical power being supplied to such device, the amount of flux emitted by the device, the thermal resistance between such device and the heat sink, and the measured temperature of the heat sink. Alternatively, the step of determining the temperature of each of the light-emitting devices can include measuring ambient temperature, and calculating the temperature of each of the light-emitting devices based on the amount of electrical power being supplied to such device, the amount of flux emitted by the device, the thermal resistance between such device and the heat sink, the total amount of electrical power being supplied to all of such devices less the total amount of flux emitted by the devices, the thermal resistance between the heat sink and the surrounding air, and the measured ambient temperature.

In another separate and independent aspect of the invention, the method controls the luminous flux spectrum of light produced by the lighting fixture despite each group emitting light having a distinct luminous flux spectrum subject to degradation over time. The method includes an initial step of establishing a time-based degradation factor for each of the plurality of groups of light-emitting devices, and a further step of supplying a prescribed amount of electrical power to the light-emitting devices in each of the plurality of groups of devices, wherein the prescribed amount of electrical power is selected, in part, based on the time-based degradation factor for each of the groups of devices, such that the groups of devices cooperate to emit light having a desired composite luminous flux spectrum throughout the lighting fixture's lifetime. The step of establishing a time-based degradation factor for each of the plurality of groups of light-emitting devices can include maintaining a record of the temperature of the devices over time.

In other more detailed features of the invention, each of the light-emitting devices of the plurality of groups of devices is a light-emitting diode. In addition, the plurality of groups of light-emitting diodes include at least four groups, collectively configured to emit light spanning a substantial contiguous portion of the visible spectrum.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
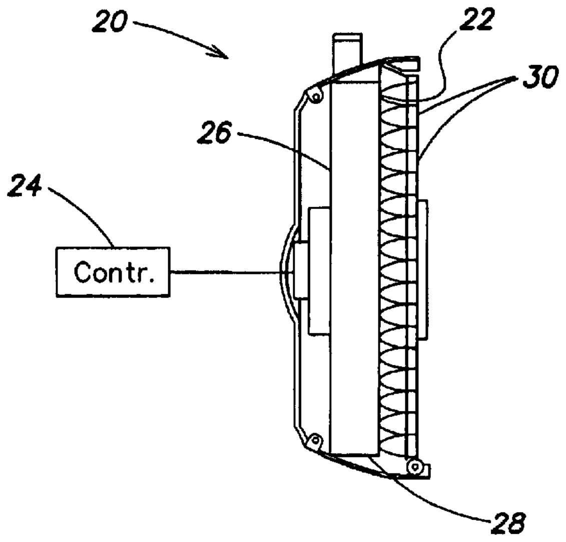
FIG. 1 is a schematic side sectional view of a lighting fixture suitable for use in carrying out the invention, the fixture including numerous groups of LEDs, each group emitting light having a distinct narrowband spectrum, the groups collectively emitting light spanning a substantial portion of the visible spectrum.
Figure 2:
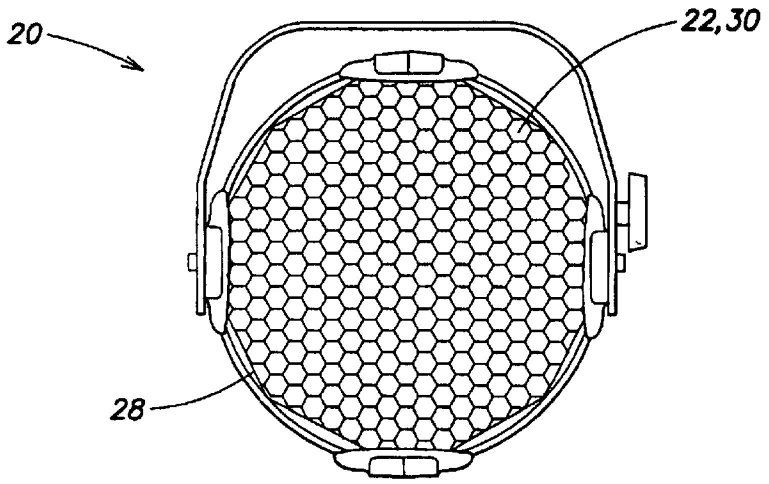
FIG. 2 is a front elevational view of the lighting fixture of FIG. 1, showing the LEDs arranged in a two-dimensional array.

With reference now to the illustrative drawings, and particularly to FIGS. 1 and 2, there is shown a lighting fixture 20 configured to project a beam of light having a selected luminous flux spectrum. The fixture includes an array of narrowband light emitters, e.g., light-emitting diodes (LEDs) 22, each configured to emit light in a narrowband color. A controller 24 supplies selected amounts of electrical power to the LEDs such that they cooperate to emit light having a prescribed composite luminous flux spectrum. The LEDs are mounted on a heat sink 26 within a housing 28. A collimating lens array 30, located immediately in front of the LED array, includes a separate lens component for each LED, for collecting the emitted light to produce a beam that is projected from the fixture, e.g., toward a theater stage (not shown).

The LEDs 22 are provided in a number of color groups, each group emitting light having a distinct narrowband color. One preferred fixture embodiment includes eight groups of LEDs, which collectively emit light having a luminous flux spectrum spanning substantially the entire visible spectrum, i.e., about 420 nanometers (nm) to about 680 nm. The colors of these eight LED groups include royal blue, blue, cyan, green, two shades of amber, red-orange, and red. Suitable LEDs emitting light in the requisite colors and at high intensities can be obtained from Lumileds Lighting, LLC, of San Jose, Calif.

The lighting fixture 20 can be precisely controlled to emit light having a wide range of colors, including white. The colors also can be selected to closely emulate the luminous flux spectra of light produced by various prior art lighting fixtures, both with and without various color filters. Co-pending application Ser. No. 10/118,828, filed Apr. 8, 2002, in the name of David W. Cunningham, now U.S. Pat. No. 6,683,423. discloses a suitable control system implemented by the controller 24, for supplying electrical power to the groups of LEDs 22 so as to produce a composite beam of light having the desired luminous flux spectrum. That application is incorporated herein by reference.

Table I identifies one suitable complement of LEDs 22 for the LED lighting fixture 20 incorporating eight different color groups. The basic color of each of the eight groups is specified in the first column, and the Lumileds bin number for that group is specified in the second column. Each Lumileds bin contains LEDs having peak wavelengths within a range of just 5 nm. The quantity of LEDs in each group is specified in the third column, and the typical peak flux wavelength for each group is specified in the fourth column. Finally, the typical upper and lower limits of the spectral half-width for the LEDs in each group, i.e., the range of wavelengths over which the flux intensity is at least one-half of the peak flux intensity, is specified in the fifth column.

TABLE I

FULL SPECTRUM LIGHTING FIXTURE

| LED Color | Lumileds Bin No. | Quantity of Devices | Peak λ (nm) | Spectral Half-Width Range (nm) |
|---|---|---|---|---|
| Royal Blue | B2 | 4 | 450 | 440–460 |
| Blue | B6 | 8 | 472 | 460–484 |
| Cyan | C3 | 18 | 501 | 486–516 |
| Green | G6 | 48 | 540 | 523–557 |
| Amber | A2 | 70 | 590 | 583–597 |
| Amber | A6 | 39 | 595 | 588–602 |
| Red-Orange | R2 | 24 | 627 | 617–637 |
| Red | R5 | 29 | 649 | 639–659 |
| — | — | 241 (Total) | — | — |

It will be noted in Table I that the upper limit of the spectral half-width of each of the eight groups of LEDs 22 generally matches the lower limit of the spectral half-width of the adjacent group. Minimization of any gaps between these upper and lower limits is desirable. This enables the lighting fixture 20 to produce light having a precisely controlled composite luminous flux spectrum. It will be appreciated that a lighting fixture incorporating even more distinct groups of LEDs could provide even greater control over the precise shape of the composite luminous flux spectrum. In such a fixture, the groups of LEDs could be configured such that the upper and lower limits of each group's spectral half-width are generally aligned with the peak wavelengths of the two adjacent groups.

As mentioned above, each Lumileds bin contains LEDs having peak wavelengths within a range of just 5 nm. The general color designation of blue actually includes LEDs from as many as five separate bins. It, therefore, is preferred to specify the LEDs using the actual Lumileds bin number rather than a mere color designation.

Figure 3:
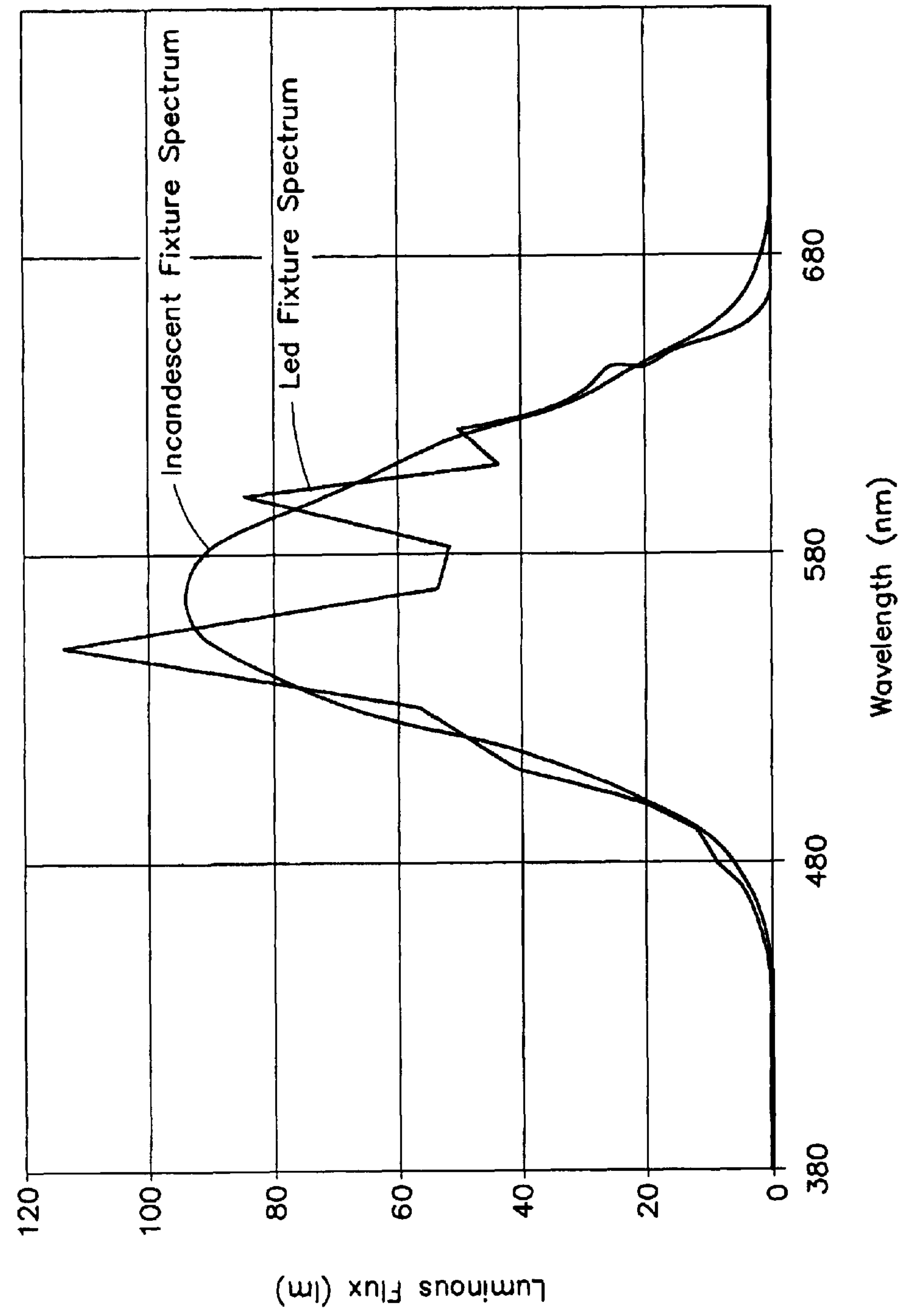
FIG. 3 is a graph depicting the luminous flux spectra for a beam of light produced by the lighting fixture of FIGS. 1–2, having eight groups of LEDs collectively emitting light across substantially the entire visible spectrum, and for a beam of light produced by a prior art lighting fixture having an incandescent lamp and no color filter.

FIG. 3 depicts the composite luminous flux spectrum of light produced when full power is applied to all of the eight groups of LEDs 22 in the lighting fixture 20 characterized in Table I. It will be noted that this spectrum spans substantially the entire visible spectrum. Also depicted in FIG. 3 is the luminous flux spectrum of a beam of light projected by a prior art lighting fixture, e.g., a Source Four® fixture, having an incandescent lamp operating at about 3250°K and having no color filter in the beam's path. The Source Four® fixture is available from Electronic Theatre Controls, of Middleton, Wis.

It will be noted in FIG. 3 that the composite spectrum of the LED lighting fixture 20 closely emulates that of the incandescent lamp lighting fixture. This enables the beam of light produced by the LED fixture to have an apparent color of white. In addition, the quantities of LEDs in each group are selected such that the total flux produced by the fixture is approximately equal to the total flux (in the visible spectrum) produced by the incandescent lamp fixture. The third column of Table I sets forth the quantities of LEDs required to provide this amount of total flux, using flux values that are projected by Lumileds to be available in the fourth quarter of 2003.

Integrating the absolute value of the difference between the two luminous flux spectra depicted in FIG. 3, across the entire visible spectrum, yields a normalized mean deviation (NMD) of just 19.0%. This integration can be performed using the following formula:

$$NMD = \frac{\int [S_T(\lambda) - S_L(\lambda)] d\lambda}{\int S_T(\lambda) d\lambda} \quad \text{(I)}$$

where:

$\lambda$ is wavelength, $S_L$ is the LED fixture spectrum, and $S_T$ is the target spectrum.

Figure 4:
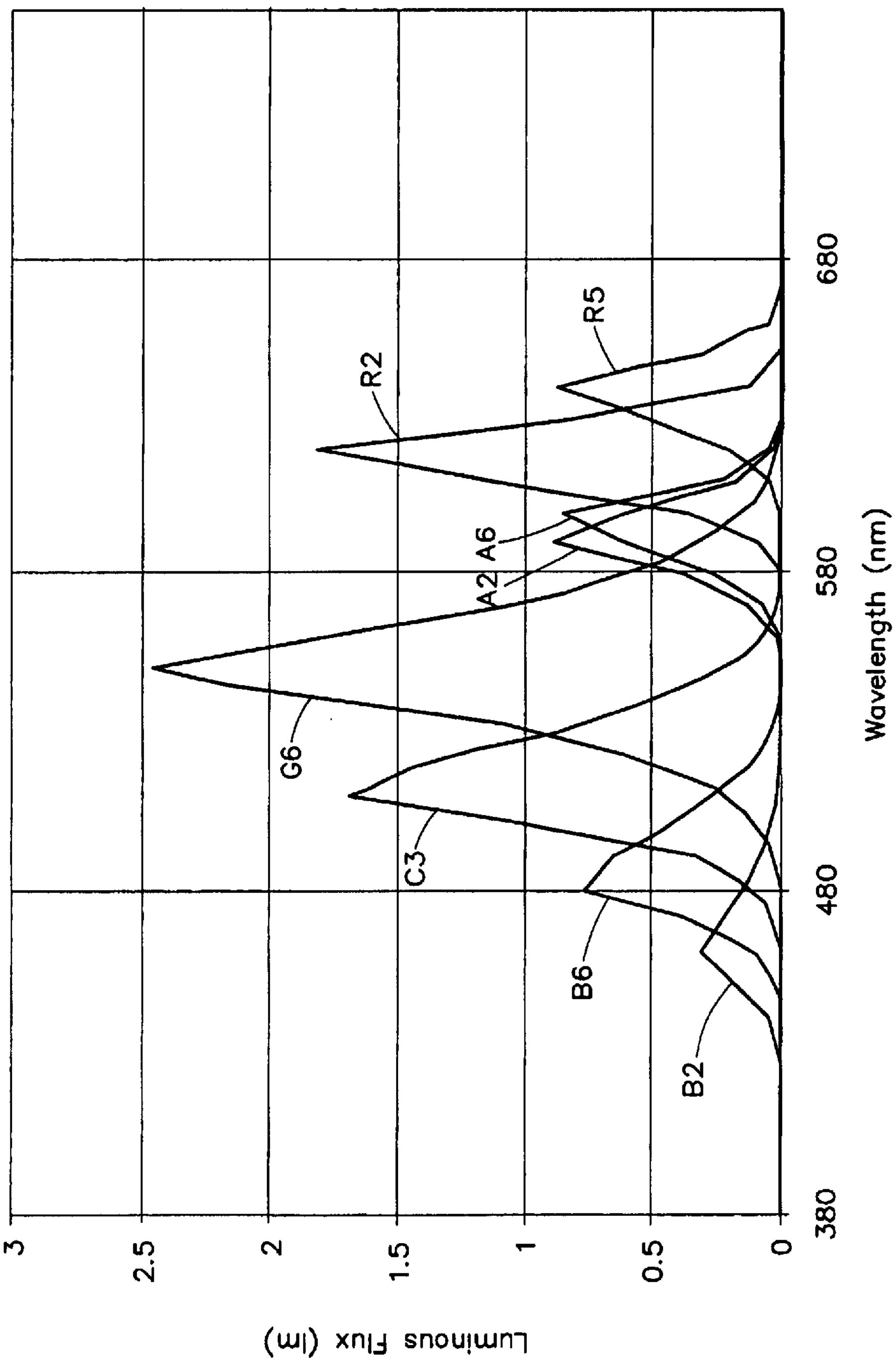
FIG. 4 is a graph depicting the luminous flux spectra for each of the eight groups of LEDs collectively represented by the graph of FIG. 3.

The luminous flux spectra for the individual LEDs 22 making up each of the eight LED groups are depicted in FIG. 4. It will be noted that these spectra overlap each other so that they combine to span a major portion of the visible spectrum. It also will be noted that the peak flux values for some of the individual spectra (e.g., the colors of cyan and green) are significantly higher than they are for other individual spectra (e.g., the two shades of amber). This reflects an inherent disparity in the efficiencies of LEDs that presently are available commercially. It also accounts for why the LED lighting fixture 20 incorporates so many more LEDs in the two amber shades (109 combined) as compared to the cyan color (18). Of course, if the efficiency disparity between the various commercially available LEDs changes in the future, appropriate changes can be made to the quantities of each LED required for the fixture to provide the desired spectrum.

The individual LEDs 22 each emit flux having a magnitude and peak wavelength that are subject to substantial initial variation. In fact, the flux magnitudes of two LEDs having the same commercial specifications can differ from each other by as much as a factor of two, and their peak wavelengths can differ from each other by as much as 20 nm, for a given electrical power input. Of course, specifying the LEDs according to their Lumileds bin number can reduce this peak wavelength variation to as low as 5 nm. These variations can cause substantial variations in the composite luminous flux spectrum of the beam of light produced by the lighting fixture 20.

Figure 5:
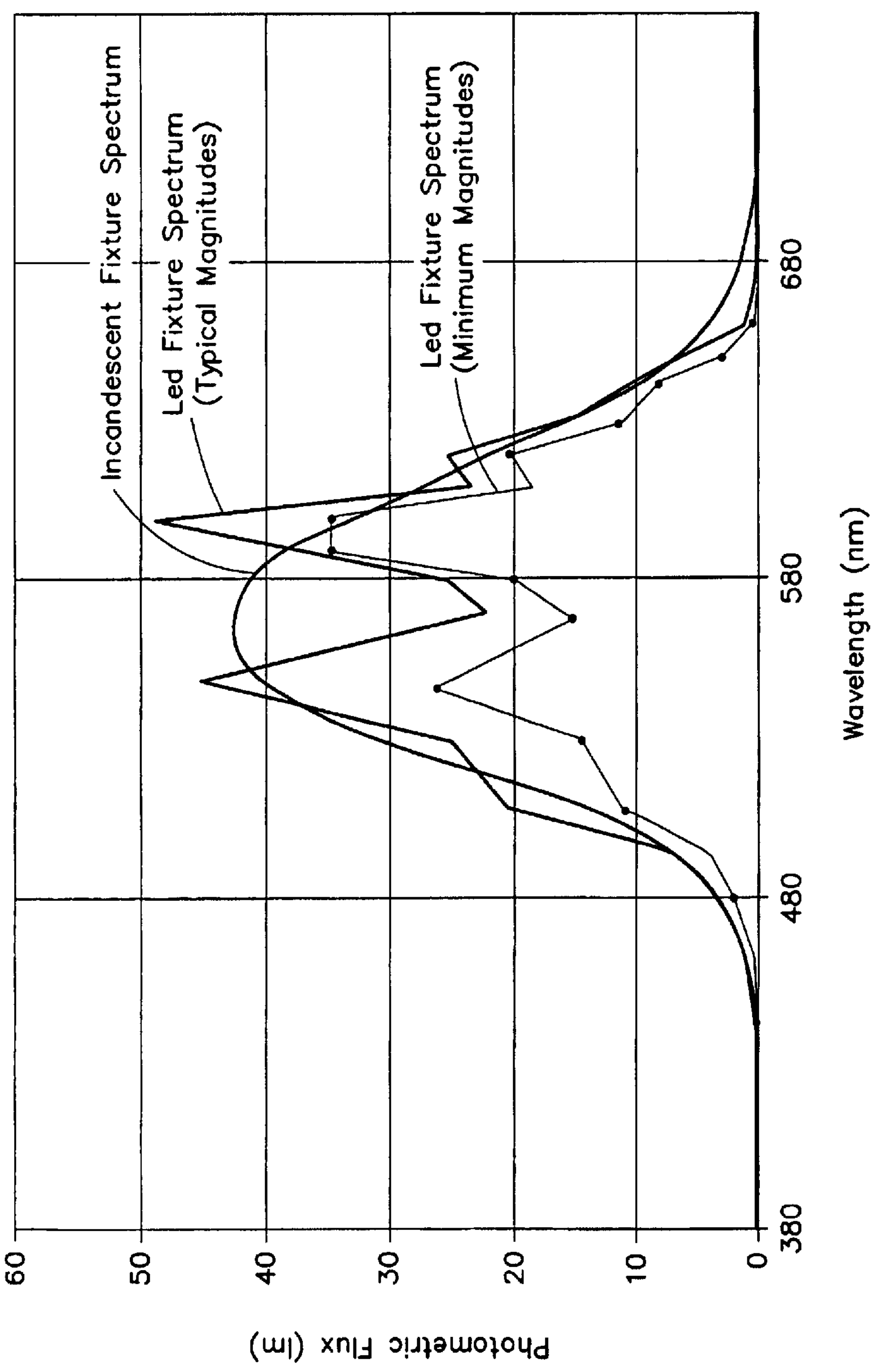
FIG. 5 is a graph depicting the luminous flux spectra of two beams of light potentially produced by the lighting fixture of FIGS. 1–2, one such beam being produced if the LEDs all emit flux having the typical magnitude for LEDs of the specified type, with the LEDs all having a junction temperature of 25° C., and the other such beam being produced if the LEDs all emit flux having the minimum magnitude for the LEDs of the specified type, again with the LEDs all having a junction temperature of 25° C. Also depicted is the luminous flux spectra of a beam of light produced by a prior art lighting fixture having an incandescent lamp and no color filter.

FIG. 5 is a graph showing how the apparent color of the projected beam can vary if the effects of initial variations in flux magnitude are not addressed. One line in the graph represents the luminous flux spectrum of a beam of light produced by the eight groups of LEDs 22, if the LEDs all receive a standardized electrical power input, all have not previously been operated, and all have junction temperatures of 25° C., and if the LEDs all have flux values that are typical for the commercial product specified. Another line in the graph represents the luminous flux spectrum of the beam produced by the eight groups of LEDs if the LEDs are likewise all powered at the same standardized electrical power input, all have not previously been operated, and all have junction temperatures of 25° C., and if the LEDs all have flux values at the low end of the range specified for the commercial product. A substantial deviation from the desired spectrum will be noted.

In fact, the spectrum of the beam of light produced by LEDs 22 having typical flux values has an NMD relative to the target spectrum of just 17.3%, whereas the spectrum of the beam of light produced by LEDs having the minimum flux values has an NMD relative to that same target spectrum of 38.0%. This represents a serious performance deficiency. As will be described below, the controller 24 is configured to compensate for these initial variations in flux magnitude and peak wavelength, so that the fixture does in fact produce a beam of light having the desired spectrum.

More particularly, the lighting fixture 20 is preliminarily calibrated by storing in the controller 24 information regarding the magnitude and peak wavelength of the flux emitted by each group of LEDs 22 in response to a standardized electrical power input. This information can be obtained by sequentially supplying the standardized electrical power input to each of the LED groups and measuring the resulting flux magnitude and peak flux wavelength. These measurement are made while the LED junctions all are maintained at a standard temperature, e.g., 25° C. Thereafter, when the fixture is in use, the controller supplies the requisite electrical power to each of the LED groups such that each such group emits light having the desired magnitude. In this manner, the LED groups can be controlled to provide a composite beam of light having a luminous flux spectrum that most closely matches the desired spectrum.

Figure 6:
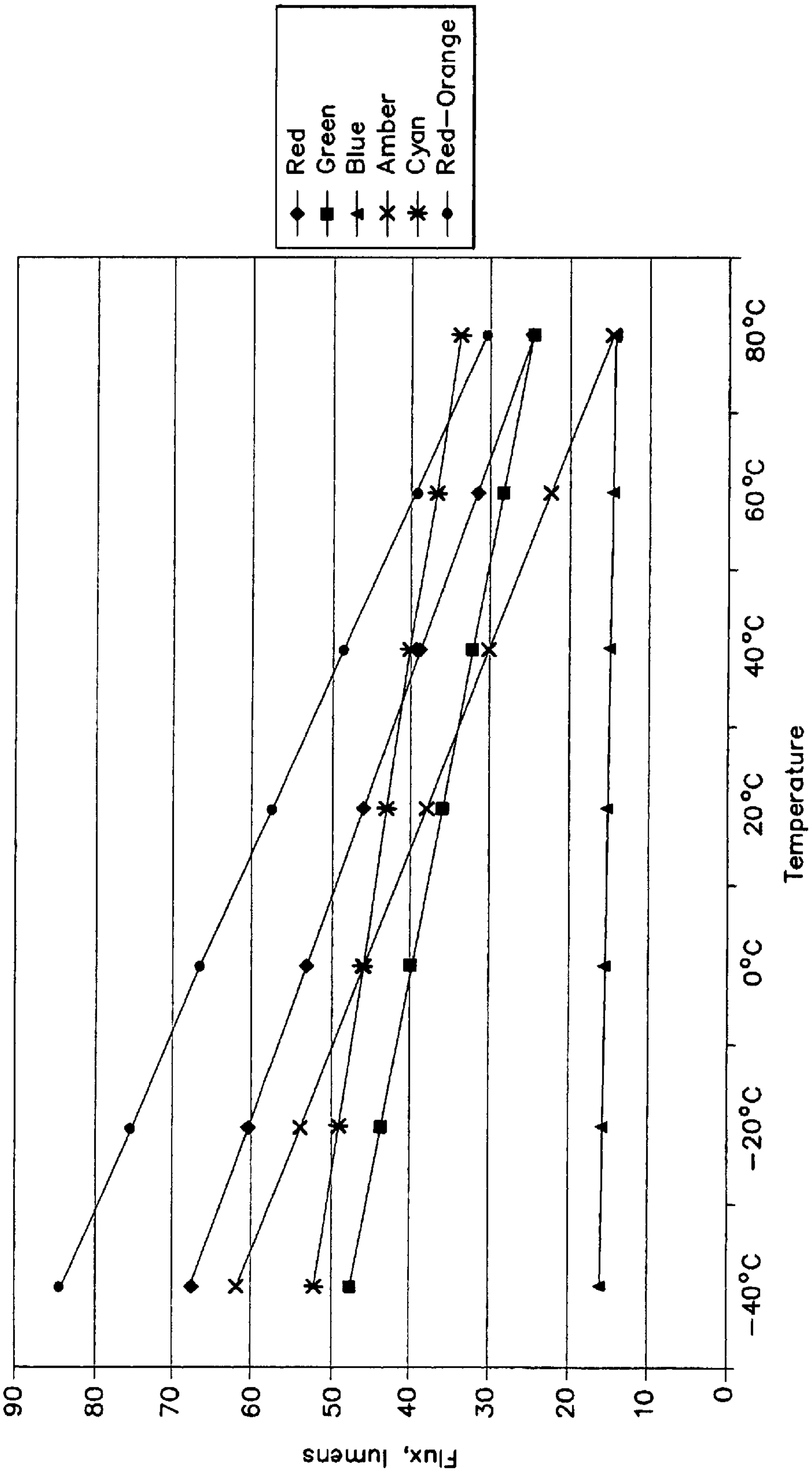
FIG. 6 is a graph depicting the relationship between flux magnitude and temperature, for the six of the eight groups of LEDs in the lighting fixture of FIGS. 1–2.

The flux emitted by each of the LEDs 22, in response to a given electrical power input, also has a magnitude and peak wavelength that can vary substantially with junction temperature. In particular, and as indicated by the graph of FIG. 6, the flux magnitude varies as an inverse f unction of temperature. The magnitude of this variation is different for each of the LED colors. For example, the variation is substantially more pronounced for LEDs having a red-orange color than it is for LEDs having a blue color. In fact, as indicated in FIG. 6, for a given electrical power input, a typical red-orange LED emits only about 55% as much flux at 80° C. as it does at 25° C., whereas a typical blue LED emits more than 90% as much flux at 80° C. as it does at 25° C.

The graph of FIG. 6 can be generated using data provided by the LED manufacturer. Alternatively, and more preferably, the graph can be generated by testing each of the eight groups of LEDs 22 in each lighting fixture 20. This enables the temperature coefficients of the actual LEDs making up the individual groups to be accounted for. The testing preferably is performed by measuring the flux output of each LED group at three different temperatures, e.g., 25° C., 50° C., and 75° C., all at a standardized electrical power input. A standard quadratic curve fit program can be used to predict the flux output of each group at other temperatures.

As mentioned above, the peak wavelength of the flux emitted by each LED also varies with junction temperature. Generally, these peak wavelength variations are less than about 10 nm over the temperature range of interest, e.g., about 25° C. to about 80° C. Data characterizing the peak wavelength variations with temperature can be provided by the LED manufacturer.

Figure 7:
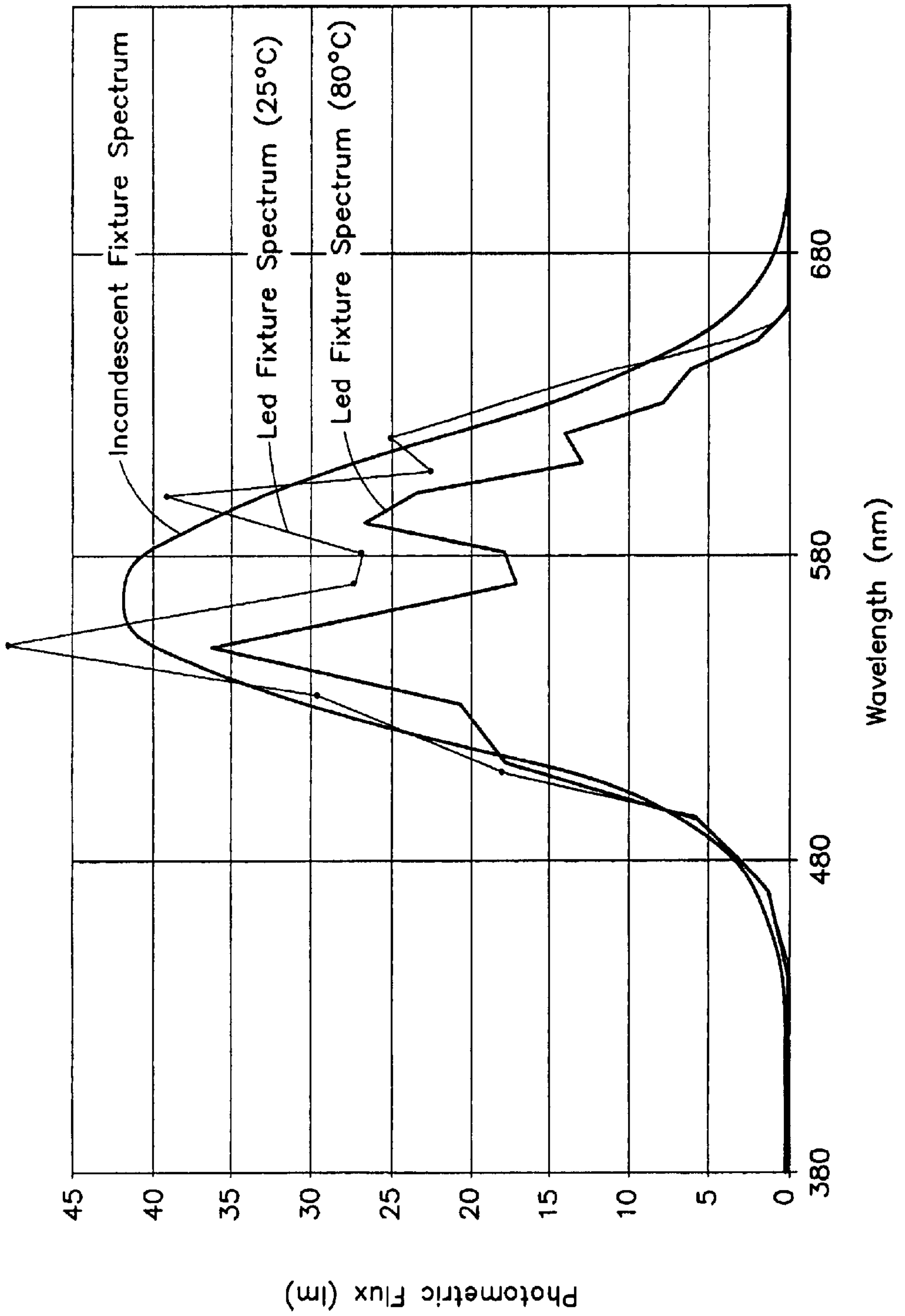
FIG. 7 is a graph depicting the luminous flux spectra of two beams of light potentially produced by the lighting fixture of FIGS. 1–2, one such beam being produced if the LEDs all have a junction temperature of 25° C., and the other such beam being produced if the LEDs' junction temperature has been increased to 80° C., with no adjustment of the amount of electrical power supplied to the eight groups of LEDs. Also depicted is the luminous flux spectra of a beam of light produced by a prior art lighting fixture having an incandescent lamp and no color filter.

These temperature-induced variations in flux magnitude and peak wavelength can cause substantial variations in the apparent color of the projected beam, as the LEDs' junction temperatures vary over time. FIG. 7 is a graph showing how the apparent color of the projected beam can vary if the effects of temperature-induced variations in flux magnitude are not addressed. One line in the graph represents the luminous flux spectrum of a beam of light produced by the eight groups of LEDs 22 when their junction temperatures all are at 25° C. Another line in the graph represents the luminous flux spectrum of the beam when the LEDs' junction temperatures all have risen to 80° C. while the same level of electrical power continues to be supplied. A substantial deviation from the desired spectrum will be noted.

In fact, the spectrum of the beam of light produced by LEDs 22 having junction temperatures of 25° C. has an NMD relative to the target spectrum of just 17.3%, whereas the spectrum of the beam of light produced by LEDs having a junction temperature that has risen to 80° C. has an NMD relative to that same target spectrum of 34.5%. This represents a serious performance deficiency. As will be described below, the controller 24 is configured to compensate for these temperature-induced variations in flux magnitude and peak wavelength, so that the fixture does in fact produce a beam of light having the desired spectrum.

More particularly, the controller 24 compensates for temperature-induced variations in flux magnitude and peak flux wavelength by preliminarily storing information regarding the flux magnitude and peak flux wavelength produced by each of the eight groups of LEDs 22 as a function of average junction temperature, for a standardized electrical power input. As mentioned above, information regarding the temperature sensitivity of the LEDs'flux magnitude preferably is determined by preliminarily testing the LED groups, whereas information regarding the temperature sensitivity of the LEDs'peak wavelength can be obtained from the LED manufacturer.

When the lighting fixture 20 is in use, the controller 24 first determines, e.g., by iterative calculation, the approximate junction temperature of each of the groups of LEDs 22. This determination is discussed in detail below. Then, based on the junction temperature determination for each group, the controller determines (e.g., by reference in part to the information represented in FIG. 6) the amount of flux and peak wavelength produced by each LED group for a standard electrical power input. The controller then supplies to the LED groups whatever electrical power is required for the fixture to produce the desired luminous flux spectrum. For example, the controller can supply whatever amount of electrical power will provide a luminous flux spectrum exhibiting the minimum NMD relative to a luminous flux spectrum to be emulated.

The controller 24 preferably determines what power levels should be supplied to each of the eight groups of LEDs 22, to achieve minimum NMD relative to the target spectrum to be emulated, in an iterative fashion. First, an initial amount of power is assumed to be supplied to all of the eight groups of LEDs 22 and the resulting NMD is calculated. Then, the amount of power assumed to be supplied to each LED group is adjusted, up or down, until the calculated NMD is minimized. This adjustment is performed for each of the eight LED groups in succession, and the process is repeated (typically several times) until a minimum NMD has been calculated.

The junction temperature of each of the LEDs 22 advantageously can be calculated using the formula set forth below. The formula determines the junction temperature of each of the eight groups of LEDs based on: (1) the electrical power supplied to the group, (2) the thermal resistance between the junction of each device and its case, (3) the thermal resistance between the case of each device and the heat sink 26, (4) the thermal resistance between the heat sink and ambient, and (5) ambient temperature.

$$T_{JX} = (P_X)(\theta_{JC}+\theta_{CS}) + \sum_{n=1}^{N} n_X P_X(\theta_{SA}) + T_A \tag{II}$$

where:

$T_{JX}$=junction temperature of group X LEDs (° C.),
$P_X$=power dissipated by each LED in group X (watts),
$\theta_{JC}$=thermal resistance between junction and case of each LED (° C./watt),
$\theta_{CS}$=thermal resistance between case of each LED and heat sink (° C./watt), $n_X$=number of LEDs in group X,
$\theta_{SA}$=thermal resistance between heat sink and ambient (° C./watt),
$T_A$=ambient temperature (° C.), and
N=number of LED groups.

Alternatively, if a temperature sensor is placed on the heat sink, itself, then the formula can be simplified to the following:

$$T_{JX}=(P_X)(\theta_{JC}+\theta_{CS})+T_S \tag{III}$$

where:

$T_S$=heat sink temperature (° C.).

This formula III assumes that the heat sink has reached a steady state, isothermal condition. Alternatively, multiple temperature sensors could be used, and a more precise estimate of each LED's junction temperature could be provided based on the LED's physical location on the heat sink. Further, a more sophisticated program could estimate each LED's junction temperature while a steady state condition is being reached, by taking into account the thermal capacities of the heat sink and the LED.

The thermal resistance values are supplied to the controller 24 as inputs based on prior measurements or based on information received from the LED supplier. The value representing ambient temperature is provided to the controller by a suitable thermometer (not shown in the drawings). The electrical power value is calculated using the formula set forth below. The formula determines the power value for each of the eight groups of LEDs based on a number of parameters, all of which are values that are supplied as inputs to the controller or that are calculated by the controller itself. Specifically, the power value for each LED group is determined using the following formula:

$$P_X=B_X[I_X(V_X-K_X(T_{JX}-25))-\phi_X] \tag{IV}$$

where:

$B_X$=duty cycle of electrical current supplied to LED group X (0.00–1.00),
$I_X$=electrical current supplied to an LED device in group X at 100% duty cycle (amps),
$V_X$=forward voltage drop across each device in LED group X (volts),
$K_X$=forward voltage drop-temperature coefficient for LED group X (volts/° C.), and
$\phi X$=radiant flux emitted by each device in LED group X (watts).

It will be appreciated that the junction temperatures for the eight different groups of LEDs 22 are determined using the above formulas in an iterative fashion. This is because the calculated power value is affected by the radiant flux and by the forward voltage drop across each LED, which both are functions of junction temperature, whereas, conversely, the calculated junction temperature value is affected by the power level. Eventually, the successively calculated values will converge to specific numbers.

Further, the flux emitted by each of the LEDs 22, in response to a given electrical power input, also has a magnitude that degrades over time. According to one manufacturer of such LEDs, Lumileds Lighting, LLC, the flux magnitude generally degrades over time at a rate that depends on the LED's junction temperature. The controller 24 is configured to compensate for such flux degradations so that the projected beam retains the desired spectrum throughout the lighting fixture's lifetime.

Figure 8:
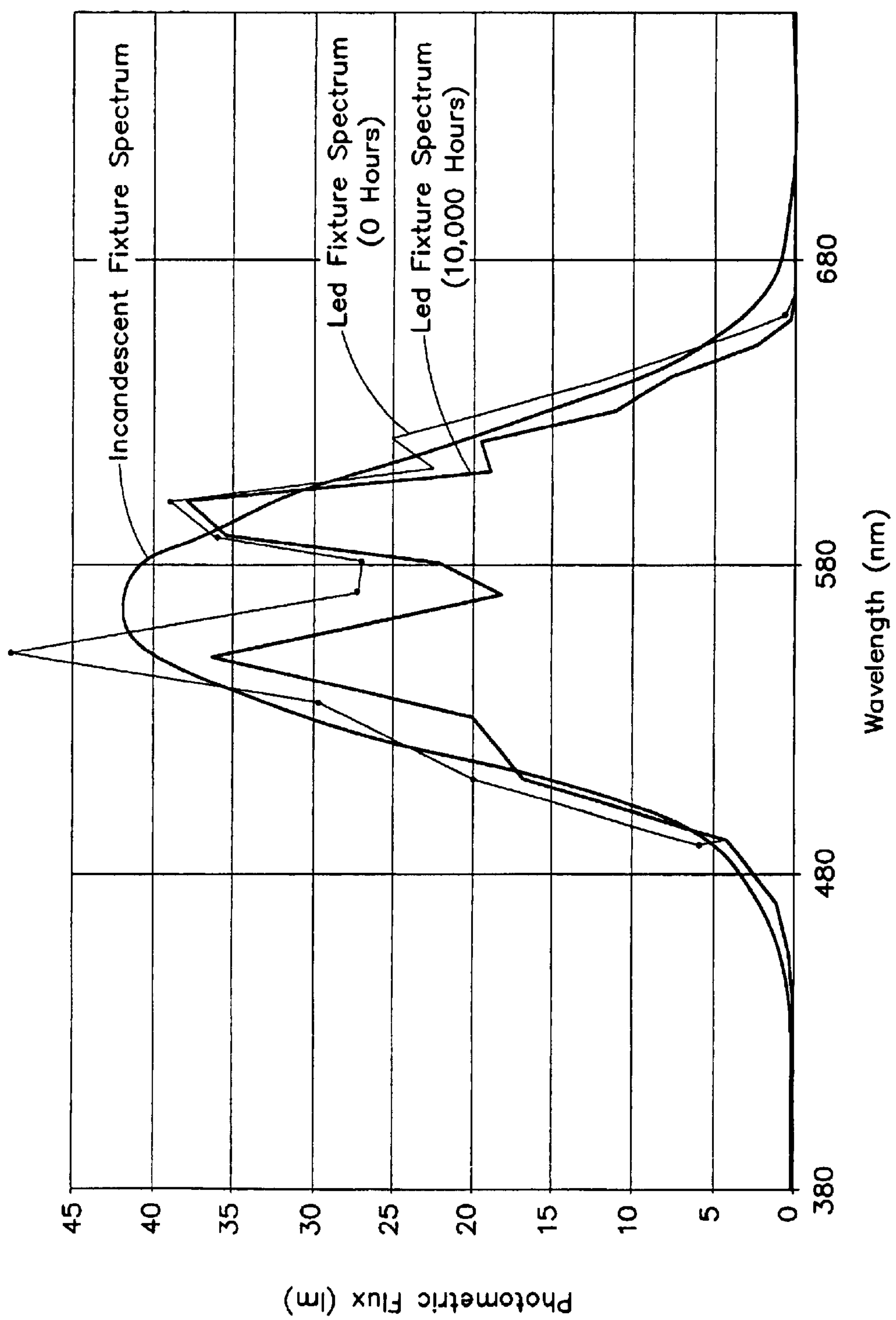
FIG. 8 is a graph depicting the luminous flux spectra of two beams of light potentially produced by the lighting fixture of FIGS. 1–2, one such beam being produced when the LEDs all have not previously been operated, and the other such beam being produced after the LEDs all have been operated at elevated temperatures for about 10,000 hours, with no adjustment of the amount of electrical power supplied to the eight groups of LEDs and with the LEDs all having the same junction temperature. Also depicted is the luminous flux spectra of a beam of light produced by a prior art lighting fixture having an incandescent lamp and no color filter.

These flux degradations over time can cause substantial variations in the apparent color of the projected beam as the LEDs' age. FIG. 8 is a graph showing how the apparent color of the projected beam can vary if these flux degradations are not addressed. One line in the graph represents the luminous flux spectrum of beam of light produced by the eight groups of LEDs 22 at a time when the LEDs have not previously been operated. Another line in the graph represents the luminous flux spectrum of the beam after the LEDs have been operated at elevated temperatures for 10,000 hours. A substantial deviation from the desired spectrum will be noted. As will be described below, the controller 24 is configured to compensate for these flux degradations, so that the fixture does in fact produce a beam of light having the desired spectrum.

Figure 9:
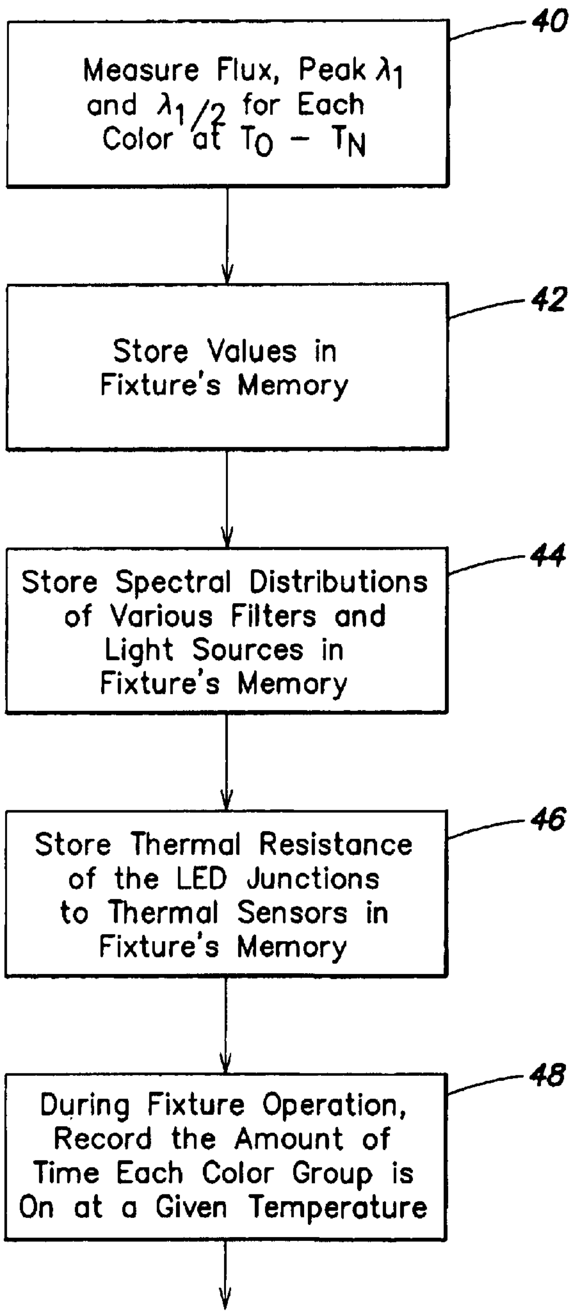
FIG. 9 is a flowchart showing the operational steps performed by the controller of the lighting fixture of FIG. 1, in calibrating the fixture and collecting data for use in subsequently controlling the luminous flux spectrum of the beam of light produced by the fixture.

FIG. 9 is a flowchart depicting the operational steps followed by the controller 24 in preliminarily calibrating the lighting fixture 20 and in collecting and maintaining information subsequently used to control the fixture so that it projects a beam of light having a desired luminous flux spectrum. In an initial step 40 of the program, data representing the initial flux magnitude, peak flux wavelength, and spectral half-width of the light emitted by each of the eight LED groups 22 is collected. This data is derived by initially measuring the parameters while a standardized electrical power input is applied sequentially to the LED groups and while the LED junctions are maintained at a standardized temperature, e.g., 25° C. These measurements are repeated with the junction temperatures maintained at a second temperature, e.g., 50° C., and a third temperature, e.g., 75° C. The measured values of these parameters are then stored in a memory (not shown) of the controller, in step 42.

Thereafter, in step 44, data representing the luminous flux spectra of a large number of conventional lighting fixtures, both with and without various conventional filters, is loaded into the controller memory. Data representing other selected luminous flux spectra also are loaded into the controller memory. This data then is available for use if the fixture 20 is later called upon to produce a beam of light emulating a selected spectrum.

Thereafter, in step 46, data is stored representing the following information: (1) the thermal resistance between the junction and case of each LED 22, (2) the thermal resistance between the case of each LED and heat sink 26, (3) the thermal resistance between heat sink and ambient, (4) the number of devices in each of the eight LED groups, and (5) the forward voltage drop-temperature coefficient for each of the eight LED groups. This data is available from the product manufacturers, or it can be calculated or derived from various thermal modeling programs. Finally, in step 48, the controller 24 maintains a record of the calculated junction temperature of each LED over time.

Figure 10:
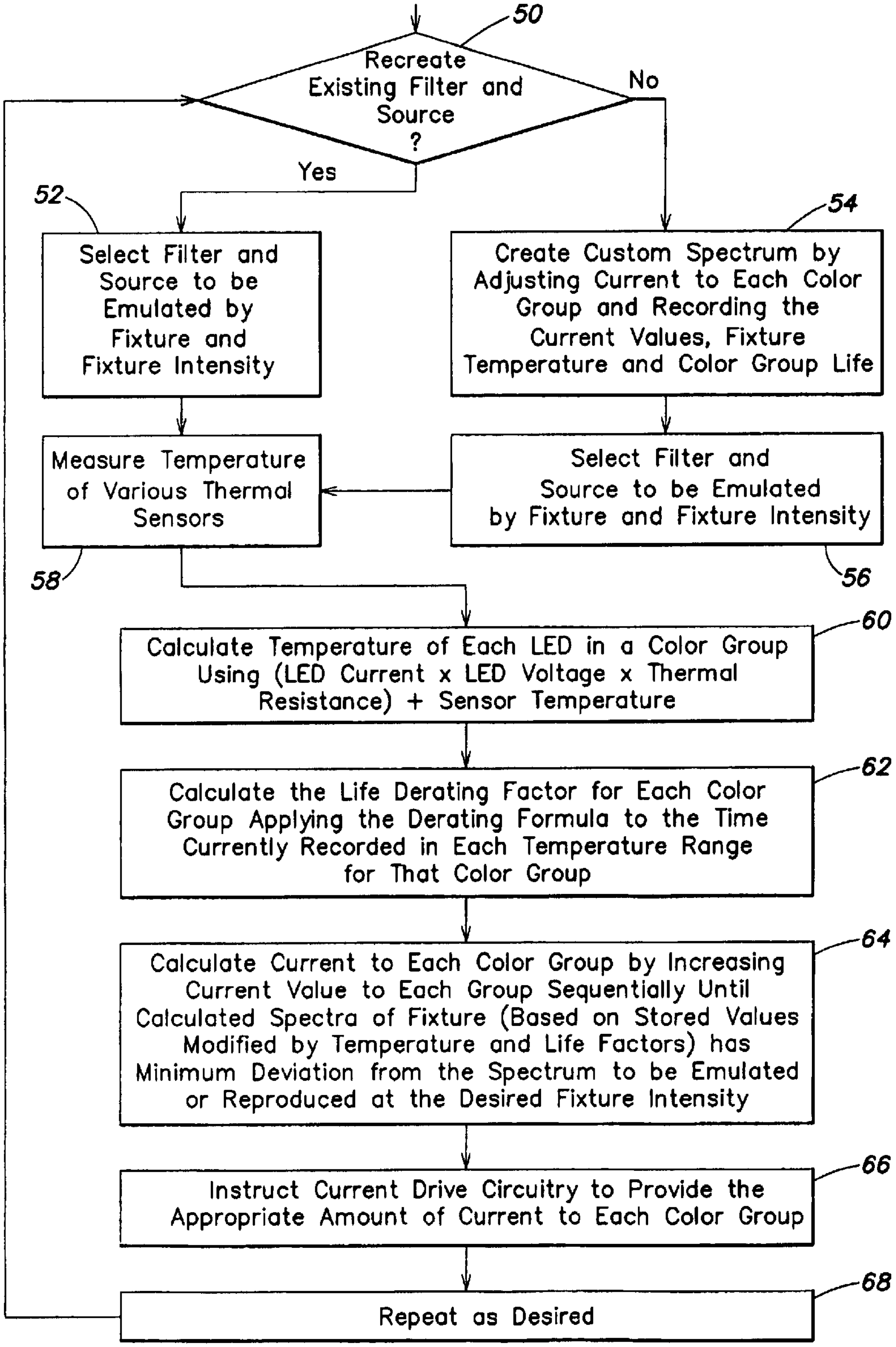
FIG. 10 is a flowchart showing the operational steps performed by the controller of the lighting fixture of FIG. 1, in supplying electrical power to the groups of LEDs such that they cooperate to produce a beam of light having a prescribed composite luminous flux spectrum, e.g., the spectrum depicted in FIG. 3.

FIG. 10 is a flowchart depicting the operational steps followed by the controller 24 in controlling the lighting fixture 20 supplying to the eight groups of LEDs 22 whatever amount of electrical current is required to produce a beam of light having the desired luminous flux spectrum. In an initial step 50, the controller determines whether or not the fixture is to be called upon to emulate the luminous flux spectrum of a pre-existing light source. If it is, then the program proceeds to step 52, where a selection is made of the particular light source to be emulated. This selection includes a selection of a color filter, if the light source includes one, and of the light beam's intensity.

On the other hand, if it is determined in step 50 that a pre-existing light source is not to be emulated, then the program proceeds to step 54, where a custom spectrum is created based on instructions supplied by the user. After the desired spectrum has been created, it is locked-in at step 56.

Following both of steps 52 and 56, the program proceeds to a series of steps in which the controller 24 will determine the particular electrical current to supply to each of the eight groups of LEDs 22 so as to cause the projected beam of light to emulate either the pre-existing light source or the custom spectrum. To this end, in step 58, the controller measures ambient temperature (or the heat sink temperature) and thereafter, in step 60, calculates the junction temperature for the LEDs in each of the eight groups. This is accomplished using the formulas set forth above, based on data either calculated by the controller or supplied to the controller in step 46, as discussed above.

Thereafter, in step 62, the controller 24 calculates a time-based degradation factor for each of the eight groups of LEDs 22, using the time/temperature data that has been accumulated in step 48, discussed above. Then, in step 64, the controller calculates, in an iterative process, the particular amount of electrical current that should be supplied to each of the eight groups of LEDs that will cause the projected beam of light to have a luminous flux spectrum having the lowest NMD relative to the spectrum to be emulated.

The controller 24 then, in step 66, provides appropriate control signals to electrical current drive circuitry (not shown), to condition the circuitry to supply the appropriate amounts of electrical current to the eight groups of LEDs 22. The LEDs in each group receiving electrical current preferably share the current equally. The particular technique for determining the optimum amounts of current is described in detail in co-pending patent application Ser. No. 10/118,828, now U.S. Pat. No. 6,683,423, identified above.

Finally, in step 68, the program returns to the step 50 of determining whether or not the lighting fixture 20 is to be called upon to emulate the luminous flux spectrum of a particular pre-existing light source or a custom spectrum. This loop continues indefinitely. Over time, the luminous flux spectrum of the fixture's projected beam will continue to emulate the selected spectrum despite short term temperature variations and despite long-term flux degradations.

It should be appreciated from the foregoing description that the present invention provides an improved method for controlling a lighting fixture of a kind having individually colored light sources, e.g., LEDs, that emit light having a distinct luminous flux spectrum that varies in its initial spectral composition, that varies with temperature, and that degrades over time. The method controls the fixture so that it projects light having a predetermined desired flux spectrum despite variations in initial spectral characteristics, despite variations in temperature, and despite flux degradations over time.

Although the invention has been described in detail with reference only to the presently preferred embodiments, those skilled in the art will appreciate that various modifications can be made without departing from the invention. Accordingly, the invention is defined only by the following claims.

I claim:

1. A method for controlling the luminous flux spectrum of light produced by a lighting fixture of a kind incorporating a plurality of groups of light-emitting devices, each group emitting light having a distinct luminous flux spectrum subject to substantial initial variability, wherein the lighting fixture lacks a filter for substantially limiting the bandwidth of light emitted by any of the plurality of groups of light-emitting devices, the method comprising:

calibrating each of the plurality of groups of light-emitting device by measuring the initial flux magnitude or light emitted by the group, at a prescribed test temperature, in response to a predetermined electrical power input; and supplying a prescribed amount of electrical power to the light-emitting devices in each of the plurality of groups of devices, such that the groups of devices cooperate to emit light having a desired composite luminous flux spectrum.

2. A method as defined in claim 1, wherein the step of calibrating further includes measuring the spectral distribution of light emitted by each of the plurality of groups of light-emitting devices in response to a predetermined electrical power input.

3. A method as defined in claim 1, wherein the method controls the lighting fixture such that is emitted light has a composite luminous flux spectrum emulating the luminous flux spectrum of a known light source, with or without a filter.

4. A method as defined in claim 1, wherein:

each of the light-emitting devices of the plurality of groups of devices is a light-emitting diode; and the plurality of groups of light-emitting diodes include at least four groups, collectively configured to emit light spanning a substantial contiguous portion of the visible spectrum.

5. A method for controlling the luminous flux spectrum of light produced by a lighting fixture of a kind incorporating a plurality of groups of light-emitting devices, each group emitting light having a distinct luminous flux spectrum subject to substantial initial variability, the method comprising:

calibrating each of the plurality of groups of light-emitting device, by measuring the spectral distribution of light emitted by the group in response to a predetermined electrical power input, wherein the step of calibrating includes measuring the initial magnitude, the initial peak wavelength, and the initial spectral half-width of flux emitted by each of the plurality of groups of light-emitting devices at a prescribed test temperature, in response to a predetermined electrical power input; and supplying a prescribed amount of electrical power to the light-emitting devices in each of the plurality of groups of devices, such that the groups of devices cooperate to emit light having a desired composite luminous flux spectrum.

6. A method for controlling the luminous flux spectrum of light produced by a lighting fixture of a kind incorporating a plurality of groups of light-emitting devices, each group emitting light having a distinct luminous flux spectrum subject to substantial initial variability, wherein the method controls the lighting fixture such that its emitted light has a composite luminous flux spectrum emulating the luminous flux spectrum of a known light source, with or without a filter, the method comprising:

calibrating each of the plurality of groups of light-emitting devices by measuring the flux magnitude of light emitted by the group in response to a predetermined electrical power input; and supplying a prescribed amount of electrical power to each of the light-emitting devices in each of the plurality of groups of devices such that the plurality of groups of devices cooperate to emit light having a composite luminous flux spectrum that has a minimum normalized mean deviation across the visible spectrum relative to the luminous flux spectrum of a known light source to be emulated, with or without an associated color filter.

7. A method for controlling the luminous flux spectrum of light produced by a lighting fixture of a kind incorporating a plurality of groups of light-emitting devices, each group emitting light having a distinct luminous flux spectrum subject to substantial initial variability, the method comprising:

calibrating each of the plurality of groups of light-emitting devices by measuring the initial flux magnitude of light emitted by the group, at a prescribed test temperature, in response to a predetermined electrical power input; and supplying a prescribed amount of electrical power to the light-emitting devices in each of the plurality of groups of devices, such that the groups of devices cooperate to emit light having a desired composite luminous flux spectrum;

wherein the distinct luminous flux spectrum of light emitted by each of the plurality of groups of light-emitting devices varies with temperature;

wherein the method further comprises determining the temperature of each of the light-emitting devices in each of the plurality of groups of devices;

and wherein the prescribed amount of electrical power that is supplied to the light-emitting devices in the step of supplying is selected, in part, based on the temperature determination for each device.

8. A method as defined in claim 7, wherein:

each group of light-emitting devices emits flux having a magnitude that varies with temperature; and the step of calibrating each of the plurality of groups of light-emitting devices includes considering measurements of the magnitude of flux emitted by each of the plurality of groups of devices at a plurality of test temperatures.

9. A method as defined in claim 7, wherein:

each group of light-emitting devices emits flux having a magnitude and a peak wavelength that vary with temperature; and the step of calibrating each of tho plurality of groups of light-emitting devices includes a preliminary step of measuring the magnitude and peak wavelength of flux emitted by each of the plurality of groups of devices at a plurality of test temperatures.

10. A method as defined in claim 7, wherein:

the plurality of groups of light-emitting devices are mounted on a heat sink; and the step of determining the temperature of each of the light-emitting devices includes measuring the temperature of the heat sink using one or more temperature sensors, and calculating the temperature of each of the light-emitting devices based on the amount of electrical power being supplied to such device, the amount of flux emitted by the device, the thermal resistance between such device and the heat sink, and the measured temperature of the heat sink.

11. A method as defined in claim 7, wherein the plurality of groups of light-emitting devices are mounted on a heat sink; and the step of determining the temperature of each of the light-emitting devices includes measuring ambient temperature, and calculating the temperature of each of the light-emitting devices based on the amount of electrical power being supplied to such device, the amount of flux emitted by the device, the thermal resistance between such device and the heat sink, the total amount of electrical power being supplied to all of such devices less the total amount of flux emitted by the devices, the thermal resistance between the heat sink and the surrounding air, and the measured ambient temperature.

12. A method as defined in claim 7, wherein the step of calibrating each of the plurality of groups of light-emitting devices includes considering a factor relating to flux degradation over time for such devices.

13. A method as defined in claim 12, wherein the step of calibrating each of the plurality of groups of light-emitting devices includes maintaining a record of the temperature of the device over time.

14. A method for controlling the luminous flux spectrum of light produced by a lighting fixture of a kind incorporating a plurality of groups of light-emitting devices, each group emitting light having a distinct luminous flux spectrum having a magnitude and a peak wavelength that vary with temperature, the method comprising:

determining the temperatures or the light-emitting devices in each of the plurality of groups of devices;

determining the spectral distribution of the flux emitted by each of the plurality of groups of light-emitting devices based on the temperature determinations, including a preliminary step of measuring the magnitude and peak wavelength of flux emitted by each of the plurality of groups of devices at a plurality of test temperatures; and supplying a prescribed amount of electrical power to the light-emitting devices in each of the plurality of groups of devices, such that the groups of devices cooperate to emit light having a composite luminous flux spectrum that has a minimum normalized mean deviation across the visible spectrum relative to the luminous flux spectrum of a known light source to be emulated, with or without a color filter.

15. A method as defined in claim 14, wherein:

each group of light-emitting devices emits flux having a magnitude that varies with temperature; and the step of determining the spectral distribution of the flux emitted by each of the plurality of groups of light-emitting devices includes considering measurements of the magnitude of flux emitted by each of the plurality of groups of devices at a plurality of test temperatures.

16. A method as defined in claim 14, wherein:

the plurality of groups of light-emitting devices are mounted on a heat sink; and the step of determining the temperature of each of the light-emitting devices includes measuring the temperature of the heat sink using one or more temperature sensors, and calculating the temperature of each of the light-emitting devices based on the amount of electrical power being supplied to such device, the amount of flux emitted by the device, the thermal resistance between such device and the heat sink, and the measured temperature of the heat sink.

17. A method as defined in claim 14, wherein:

each of the light-emitting devices of the plurality of groups of devices is a light-emitting diode; and the plurality of groups of light-emitting diodes include at least four groups, collectively configured to emit light spanning a substantial contiguous portion of the visible spectrum.

18. A method for controlling the luminous flux spectrum of light produced by a lighting fixture of a kind incorporating a plurality of groups of light-emitting devices are mounted on a heat sink, each group emitting light having a distinct luminous flux spectrum that varies with temperature, the method comprising:

determining the temperatures of the light-emitting devices in each of the plurality of groups of devices;

determining the spectral distribution of the flux emitted by each of the plurality of groups of light-emitting devices based on the temperature determinations; and supplying a prescribed amount of electrical power to the light-emitting devices in each of the plurality of groups of devices, such that the groups of devices cooperate to emit light having a desired composite luminous flux spectrum;

wherein the step of determining the temperature of each of the light-emitting devices includes measuring ambient temperature, and calculating the temperature of each of the light-emitting devices based on the amount of electrical power being supplied to such device, the amount of flux emitted by the device, the thermal resistance between such device and the heat sink, the total amount of electrical power being supplied to all of such devices less the total amount of flux emitted by the devices, the thermal resistance between the heat sink and the surrounding air, and the measured ambient temperature.

19. A method for controlling the luminous flux spectrum of light produced by a lighting fixture of a kind incorporating a plurality of groups of light-emitting devices, each group emitting light having a distinct luminous flux spectrum that varies with temperature, the method comprising: determining the temperatures of the light-emitting devices in each of the plurality of groups of devices;

determining the spectral distribution of the flux emitted by each of the plurality of groups of light-emitting devices based on the temperature determinations and also based on a factor relating to flux degradation over time for such devices; and supplying a prescribed amount of electrical power to the light-emitting devices in each of the plurality of groups of devices, such that the groups of devices cooperate to emit light having a desired composite luminous flux spectrum.

20. A method as defined in claim 19, wherein the step of determining the spectral distribution of the flux emitted by each of the plurality of groups of light-emitting devices includes maintaining a record of the temperature of the device over time.

21. A method for controlling the luminous flux spectrum of light produced by a lighting fixture of a kind incorporating a plurality of groups of light-emitting devices, each group emitting light having a distinct luminous flux spectrum that varies with temperature, the method comprising:

determining the temperatures of the light-emitting devices in each of the plurality of groups of devices;

determining the spectral distribution of the flux emitted by each of the plurality of groups of light-emitting devices based on the temperature determinations; and supplying a prescribed amount of electrical power to the light-emitting devices in each of the plurality of groups of devices, such that the groups of devices cooperate to emit light having a desired composite luminous flux spectrum;

wherein the step of supplying includes supplying an amount of electrical power to each of the light-emitting devices in each of the plurality of groups of devices such that the plurality of groups of devices cooperate to emit light having a composite luminous flux spectrum that has a minimum normalized mean deviation across the visible spectrum relative to the luminous flux spectrum of a known light source to be emulated, with or without a color filter.

22. A method for controlling the luminous flux spectrum of light produced by a lighting fixture of a kind incorporating a plurality of groups of light-emitting devices, each group emitting light having a distinct luminous flux spectrum subject to degradation over time, the method comprising:

establishing a time-based degradation factor for each of the plurality of groups of light-emitting devices; and supplying a prescribed amount of electrical power to the light-emitting devices in each of the plurality of groups of devices, wherein the prescribed amount of electrical power is selected, in part, based on the time-based degradation factor established for each of the groups of devices, such that the groups of devices cooperate to emit light having a desired composite luminous flux spectrum throughout the lighting fixture's lifetime.

23. A method as defined in claim 22, wherein the step of establishing a time-based degradation factor for each of the plurality of groups of light-emitting devices includes maintaining a record of the temperature of the devices over time.

* * * * *

UNITED STATES PATENT AND TRADEMARK OFFICE

CERTIFICATE OF CORRECTION

PATENT NO. : 7,023,543 B2

APPLICATION NO. : 10/211769
DATED : April 4, 2006
INVENTOR(S) : David W. Cunningham It is certified that error appears in the above-identified patent and that said Letters Patent is hereby corrected as shown below:

Column 12, line 58 - Column 13, line 8,
Should read:
1. A method for controlling the luminous flux spectrum of light produced by a lighting fixture of a kind incorporating a plurality of groups of light-emitting devices, each group emitting light having a distinct luminous flux spectrum subject to substantial initial variability, wherein the lighting fixture lacks a filter for substantially limiting the bandwidth of light emitted by any of the plurality of groups of light-emitting devices, the method comprising:

calibrating each of the plurality of groups of light-emitting device by measuring the initial flux magnitude of light emitted by the group, at a prescribed test temperature, in response to a predetermined electrical power input; and supplying a prescribed amount of electrical power to the light-emitting devices in each of the plurality of groups of devices, such that the groups of devices cooperate to emit light having a desired composite luminous flux spectrum.

Signed and Sealed this

Eleventh Day of July, 2006

JON W. DUDAS
*Director of the United States Patent and Trademark Office*